(12) United States Patent
McCusker et al.

(10) Patent No.: US 10,235,890 B1
(45) Date of Patent: Mar. 19, 2019

(54) SYSTEM FOR NAVIGATING AN AIRCRAFT DISPLAY WITH A MOBILE DEVICE

(71) Applicant: Rockwell Collins, Inc., Cedar Rapids, IA (US)

(72) Inventors: Patrick D. McCusker, Walker, IA (US); Douglas A. Bell, Marion, IA (US); Travis S. Vanderkamp, Marion, IA (US); Sarah Barber, Cedar Rapids, IA (US); Michael J. Schmitt, Cedar Rapids, IA (US); Brent J. Nelson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/977,375

(22) Filed: May 11, 2018

(51) Int. Cl.
*G08G 5/00* (2006.01)
*G01C 23/00* (2006.01)
*B64D 45/00* (2006.01)

(52) U.S. Cl.
CPC ....... *G08G 5/0021* (2013.01); *B64D 45/0005* (2013.01); *G01C 23/00* (2013.01); *B60K 2350/1072* (2013.01)

(58) Field of Classification Search
CPC ...... G08G 5/0021; B64D 43/00; G01C 23/00; B60K 2350/1072
USPC ........................................ 340/961, 461, 945
See application file for complete search history.

(56) References Cited

U.S. PATENT DOCUMENTS

| | | | | |
|---|---|---|---|---|
| 6,701,227 | B2 * | 3/2004 | McConnell | G01D 7/04 340/961 |
| 7,683,771 | B1 * | 3/2010 | Loeb | B60K 35/00 340/461 |
| 8,598,999 | B2 * | 12/2013 | Tuzar | B60K 37/02 340/461 |
| 8,633,913 | B1 * | 1/2014 | Raghu | G08G 5/0021 340/945 |
| 9,284,045 | B1 * | 3/2016 | Springer | G08G 5/003 |
| 2010/0127847 | A1 * | 5/2010 | Evans | G06F 3/04817 340/461 |
| 2011/0171612 | A1 * | 7/2011 | Gelinske | G09B 9/08 434/35 |
| 2016/0057032 | A1 * | 2/2016 | Tieftrunk | G01C 21/00 701/533 |

* cited by examiner

*Primary Examiner* — John A Tweel, Jr.
(74) *Attorney, Agent, or Firm* — Angel N. Gerdzhikov; Donna P. Suchy; Daniel M. Barbieri (57) ABSTRACT

Systems and methods for navigating an aircraft display with a mobile device are disclosed. In embodiments, a system includes an aircraft display and a controller in communication with the aircraft display and a mobile device. The controller is configured to generate a graphical user interface at the aircraft display and mirror the graphical user interface at the mobile device. The controller is further configured to receive a user input via the mobile device and configured to update the graphical user interface at the aircraft display and the mobile device based upon the user input.

20 Claims, 5 Drawing Sheets

SYSTEM FOR NAVIGATING AN AIRCRAFT DISPLAY WITH A MOBILE DEVICE

BACKGROUND

An aircraft may be equipped with at least one display system. On older flight decks, the display systems typically lack a cursor control panel. Thus, there is very little capability to support interactive applications. For example, older aircraft display systems may only support simple line select functions that are designed to support text-oriented displays where a given line of text at a fixed location on the display serves as a menu item to be selected. Line select functions do not support modern human-machine interfaces based on point-and-click technologies, such as rollerball/optical mice, track/touch pads, track balls, and/or joysticks that allow the user to move a cursor over a display widget and then select the widget (e.g., by clicking, double-clicking, or the like). This dramatically limits the ability to bring modern applications to older flight decks. Consequently, there is a need for systems and methods that can be integrated with older flight decks to enhance the interface capabilities of an aircraft display system.

SUMMARY

In an aspect, embodiments of the inventive concepts disclosed herein are directed to a system for navigating an aircraft display with a mobile device. In embodiments, the system includes an aircraft display and a controller in communication with the aircraft display and a mobile device. The controller is configured to generate a graphical user interface at the aircraft display and mirror the graphical user interface at the mobile device. The controller is further configured to receive a user input via the mobile device and configured to update the graphical user interface at the aircraft display and the mobile device based upon the user input.

In some embodiments, the system employs a mobile device having a touchscreen display. For example, the controller may be configured to generate a graphical user interface at the aircraft display and mirror the graphical user interface at the touchscreen display of the mobile device. The controller may be further configured to receive a user input via the touchscreen display of the mobile device and configured to update the graphical user interface at the aircraft display and the touchscreen display of the mobile device based upon the user input.

In a further aspect, embodiments of the inventive concepts disclosed herein are directed to a method of navigating an aircraft display with a mobile device. In embodiments, the method includes generating a graphical user interface at an aircraft display and mirroring the graphical user interface at a mobile device. The method may further include receiving a user input via the mobile device and updating the graphical user interface at the aircraft display and the mobile device based upon the user input.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for navigating an aircraft display with a mobile device. One technology that is common on laptop computers is a track pad or touch pad, which is a specialized surface that can track the location and movement of a user's finger across the pad. The tracking of finger location and movement can be mapped to a display to move a cursor around the display and to input tapping/clicking events. The systems and methods described herein can employ a mobile device with a touchscreen to emulate a track pad. Additionally, a hosted application can mirror the content from an aircraft display onto a display of the mobile device. This means the images produced by the application will be displayed on at the aircraft display and the mobile device.

In embodiments, a graphical user interface is generated at an aircraft display and mirrored (e.g., also generated) at a mobile device display. User inputs for navigating the graphical user interface can be entered via the mobile device, whereby the graphical user interface at the aircraft display and the mobile device are both updated based upon the user inputs. In some embodiments, movement of a user's finger across the touchscreen as well as tapping/clicking events can be interpreted by a hosted application, and the hosted application can simultaneously update a graphical user interface (e.g., displayed images) at aircraft display and the display of the mobile device. Thus, the operation of the aircraft display and the mobile device can be synchronized.

Using a mobile device as a track pad provides the tools to host a modern human machine interface at an aircraft display, which has the advantage of being viewable by multiple flight crew members (e.g., pilot and co-pilot) during flight. In most cases, a pilot will be able to look at the aircraft display and use the mobile device as a track pad without looking at the mobile device. However, there may be times (such as turbulent conditions), when it will be easier for the pilot to look at the mobile device while using it to enter user inputs. Thus, having the application mirror the graphical user interface at a display of the mobile device enables the pilot to see exactly where his/her finger is placed relative to active spots on the display (e.g., selectable features, windows, icons, tabs, text boxes, etc.). Furthermore, a co-pilot can monitor the operation of the graphical user interface at the aircraft display. In some implementations, the co-pilot can view cursor movement, item selection, text entry, and any other user inputs entered via the mobile device. Thus, the co-pilot can have complete awareness of the actions taken by the pilot that is using the mobile device to navigate the graphical user interface.

Figure 1:
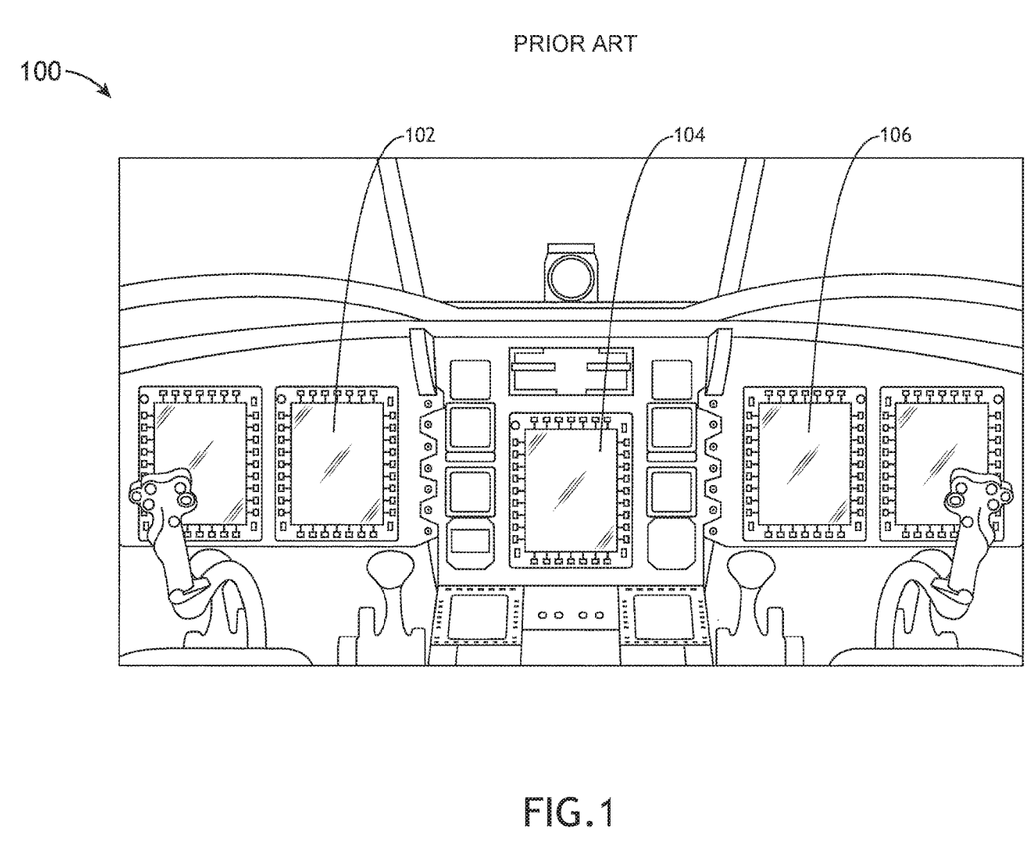
FIG. 1 is an illustration of an aircraft environment in which a system for navigating an aircraft display with a mobile device may be implemented, in accordance with example embodiments of this disclosure.

FIG. 1 illustrates an example embodiment of an aircraft environment 100 in which a system and method for navigating an aircraft display with a mobile device may be implemented. For example, the aircraft environment 100 (e.g., a cockpit) includes one or more displays that can be employed to present electronic maps. The aircraft environment 100 in FIG. 1 is shown to include at least one primary flight display 102 and at least one multi-function display 104 that are viewable by a flight crew member (e.g., pilot). In some embodiments, the aircraft environment 100 may further include at least one primary/secondary flight display 106 that is viewable by another flight crew member (e.g., co-pilot). The aircraft environment 100 illustrated in FIG. 1 illustrates an example embodiment. However, in other embodiments, the aircraft 100 environment can include any number of display devices (e.g., one, two, three, or more displays) including one or more primary flight displays, secondary flight displays, and/or multi-function displays.

Figure 2:
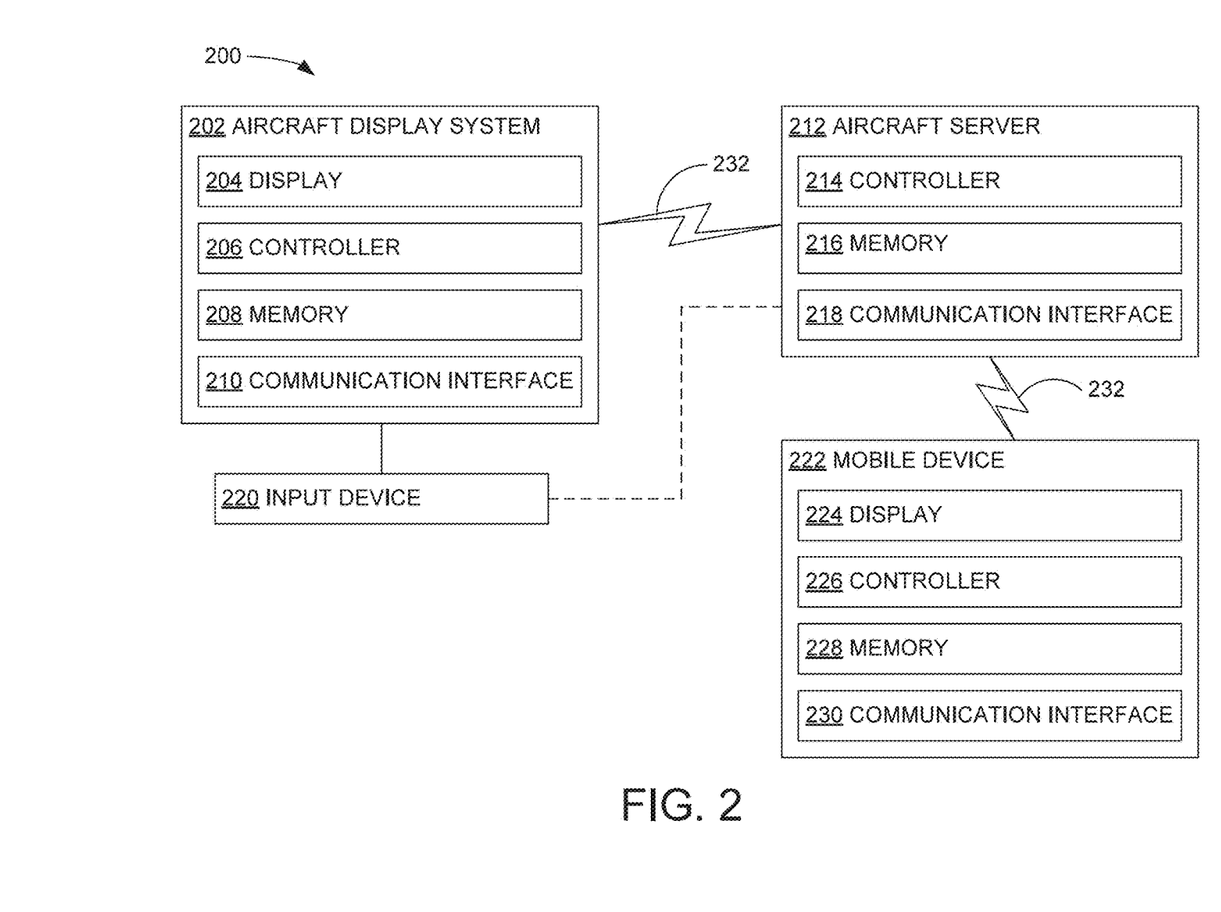
FIG. 2 is a block diagram illustrating a system for navigating an aircraft display with a mobile device, in accordance with example embodiments of this disclosure.

FIG. 2 illustrates an example embodiment of a system 200 for navigating an aircraft display with a mobile device. The system 200 includes an aircraft display system 202 having at least one display 204. For example, the display 204 may be a primary flight display (e.g., display 102 or 106), a multi-function display (e.g., display 104), or any other type of aircraft display. The aircraft display system 202 may further include a controller 206, memory 208, and a communications interface 210.

The controller 206 provides processing functionality for at least the aircraft display system 202 and can include any number of processors, micro-controllers, circuitry, field programmable gate array (FPGA) or other processing systems, and resident or external memory for storing data, executable code, and other information accessed or generated by the aircraft display system 202. The controller 206 can execute one or more software programs embodied in a non-transitory computer readable medium (e.g., memory 208) that implement techniques described herein. The controller 206 is not limited by the materials from which it is formed or the processing mechanisms employed therein and, as such, can be implemented via semiconductor(s) and/or transistors (e.g., using electronic integrated circuit (IC) components), and so forth.

The memory 208 can be an example of tangible, computer-readable storage medium that provides storage functionality to store various data and/or program code associated with operation of the aircraft display system 202/controller 206, such as software programs and/or code segments, or other data to instruct the controller 206, and possibly other components of the aircraft display system 202, to perform the functionality described herein. Thus, the memory 208 can store data, such as a program of instructions for operating the aircraft display system 202, including its components (e.g., display 204, controller 206, communication interface 210, etc.), and so forth. It should be noted that while a single memory 208 is described, a wide variety of types and combinations of memory (e.g., tangible, non-transitory memory) can be employed. The memory 208 can be integral with the controller 206, can comprise stand-alone memory, or can be a combination of both. Some examples of the memory 208 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 210 can be operatively configured to communicate with components of the aircraft display system 202. For example, the communication interface 210 can be configured to retrieve data from the controller 206 or other devices (e.g., aircraft server 212, input device 220, and/or mobile device 222), transmit data for storage in the memory 208, retrieve data from storage in the memory 208, and so forth. The communication interface 210 can also be communicatively coupled with the controller 206 to facilitate data transfer between components of the aircraft display system 202 and the controller 206. It should be noted that while the communication interface 210 is described as a component of the aircraft display system 202, one or more components of the communication interface 210 can be implemented as external components communicatively coupled to the aircraft display system 202 via a wired and/or wireless connection. The aircraft display system 202 can also include and/or connect to one or more input/output (I/O) devices (e.g., via the communication interface 210), such as display 204, an input device 220 (e.g., a mouse, a trackball, a trackpad, a joystick, a line select device, a touchpad, a touchscreen, a keyboard, a keypad, a microphone (e.g., for voice commands)), and so forth. In embodiments, the communication interface 210 includes or is coupled to a transmitter, receiver, transceiver, physical connection interface, or any combination thereof.

The communication interface 210 may facilitate connectivity between the aircraft display system 202 and an aircraft server 212. For example, the communication interface 210 can be configured to communicate directly with the aircraft server 212 (e.g., via an ad-hoc connection), or may be configured to communicate with the aircraft server 212 over a network 232 (e.g., a wired/wireless network). In some embodiments, the aircraft server 212 is configured to generate display signals for the aircraft display system 202, send data to or receive data from the aircraft display system 202, and/or host an application running on the aircraft display system 202.

In embodiments, the aircraft server 212 includes a controller 214, memory 216, and a communication interface 218. The controller 214 provides processing functionality for at least the aircraft server 212 and can include any number of processors, micro-controllers, circuitry, field programmable gate array (FPGA) or other processing systems, and resident or external memory for storing data, executable code, and other information accessed or generated by the aircraft server 212. The controller 214 can execute one or more software programs embodied in a non-transitory computer readable medium (e.g., memory 216) that implement techniques described herein. The controller 214 is not limited by the materials from which it is formed or the processing mechanisms employed therein and, as such, can be implemented via semiconductor(s) and/or transistors (e.g., using electronic integrated circuit (IC) components), and so forth.

The memory 216 can be an example of tangible, computer-readable storage medium that provides storage functionality to store various data and/or program code associated with operation of the aircraft server 212/controller 214, such as software programs and/or code segments, or other data to instruct the controller 214, and possibly other components of the aircraft server 212, to perform the functionality described herein. Thus, the memory 216 can store data, such as a program of instructions for operating the aircraft server 212, including its components (e.g., controller 214, communication interface 218, etc.), and so forth. It should be noted that while a single memory 216 is described, a wide variety of types and combinations of memory (e.g., tangible, non-transitory memory) can be employed. The memory 216 can be integral with the controller 214, can comprise stand-alone memory, or can be a combination of both. Some examples of the memory 216 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 218 can be operatively configured to communicate with components of the aircraft server 212. For example, the communication interface 218 can be configured to retrieve data from the controller 214 or other devices (e.g., aircraft display system 202 and/or mobile device 222), transmit data for storage in the memory 216, retrieve data from storage in the memory 216, and so forth. The communication interface 218 can also be communicatively coupled with the controller 214 to facilitate data transfer between components of the aircraft server 212 and the controller 214. It should be noted that while the communication interface 218 is described as a component of the aircraft server 212, one or more components of the communication interface 218 can be implemented as external components communicatively coupled to the aircraft server 212 via a wired and/or wireless connection. The aircraft server 212 can also include and/or connect to one or more input/output (I/O) devices (e.g., via the communication interface 218), such as a display, a mouse, a trackball, a trackpad, a joystick, a line select device, a touchpad, a touchscreen, a keyboard, a keypad, a microphone (e.g., for voice commands), and so on. In embodiments, the communication interface 218 includes or is coupled to a transmitter, receiver, transceiver, physical connection interface, or any combination thereof.

The communication interface 218 may facilitate connectivity between the aircraft server 212 and a mobile device 222 (e.g., a smartphone, tablet, notebook computer, wearable device (e.g., smartwatch), media player, or the like). For example, the communication interface 218 can be configured to communicate with the mobile device 222 over a network 232 (e.g., a wireless network), or via Bluetooth, near-field communication (NFC), internet connection, or the like. In some embodiments, the aircraft server 212 is in communication with the aircraft display system 202 and the mobile device 222. In other embodiments, the mobile device 222 may be communicatively coupled to the aircraft display system 202. For example, the communication interface 210 of the aircraft display system 202 may be configured to communicate with the mobile device 222 over the network 232, or via Bluetooth, NFC, internet connection, or the like. In embodiments, the aircraft server 212 and/or the aircraft display system 202 may be configured to communicate with (e.g., host) an application running on the mobile device 222.

The mobile device 222 includes a display 224. The display 224 may be any type of mobile device display (e.g., a LCD, LED display, OLED display, or the like). In some embodiments, the display 224 is a touchscreen display. For example, the display 224 can be configured to present a graphical user interface and accept single touch and/or multi-touch user inputs. The mobile device 222 further includes a controller 226, memory 228, and a communication interface 230.

The controller 226 provides processing functionality for at least the mobile device 222 and can include any number of processors, micro-controllers, circuitry, field programmable gate array (FPGA) or other processing systems, and resident or external memory for storing data, executable code, and other information accessed or generated by the mobile device 222. The controller 226 can execute one or more software programs embodied in a non-transitory computer readable medium (e.g., memory 228) that implement techniques described herein. The controller 226 is not limited by the materials from which it is formed or the processing mechanisms employed therein and, as such, can be implemented via semiconductor(s) and/or transistors (e.g., using electronic integrated circuit (IC) components), and so forth.

The memory 228 can be an example of tangible, computer-readable storage medium that provides storage functionality to store various data and/or program code associated with operation of the mobile device 222/controller 226, such as software programs and/or code segments, or other data to instruct the controller 226, and possibly other components of the mobile device 222, to perform the functionality described herein. Thus, the memory 228 can store data, such as a program of instructions for operating the mobile device 222, including its components (e.g., display 224, controller 226, communication interface 230, etc.), and so forth. It should be noted that while a single memory 228 is described, a wide variety of types and combinations of memory (e.g., tangible, non-transitory memory) can be employed. The memory 228 can be integral with the controller 226, can comprise stand-alone memory, or can be a combination of both. Some examples of the memory 228 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 230 can be operatively configured to communicate with components of the mobile device 222. For example, the communication interface 230 can be configured to retrieve data from the controller 226 or other devices (e.g., aircraft display system 202 and/or aircraft server 212), transmit data for storage in the memory 228, retrieve data from storage in the memory 228, and so forth. The communication interface 230 can also be communicatively coupled with the controller 226 to facilitate data transfer between components of the mobile device 222 and the controller 226. It should be noted that while the communication interface 230 is described as a component of the mobile device 222, one or more components of the communication interface 230 can be implemented as external components communicatively coupled to the mobile device 222 via a wired and/or wireless connection. The mobile device 222 can also include and/or connect to one or more input/output (I/O) devices (e.g., via the communication interface 230), such as display 224, a trackpad, a joystick, a touchpad, a touchscreen (e.g., display 224), a keyboard, a keypad, a microphone (e.g., for voice commands) and so on. In embodiments, the communication interface 230 includes or is coupled to a transmitter, receiver, transceiver, physical connection interface, or any combination thereof.

Figure 3:
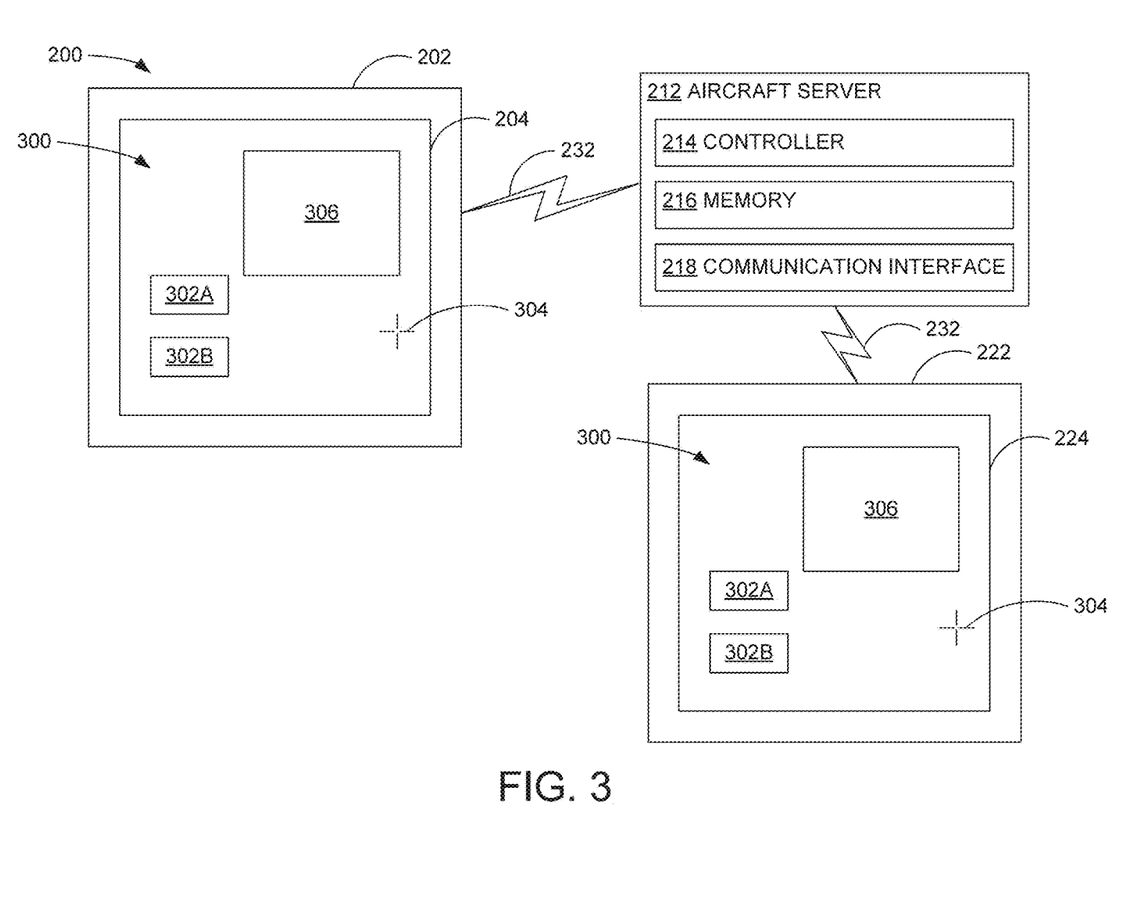
FIG. 3 is a block diagram illustrating a system for navigating an aircraft display with a mobile device, in accordance with example embodiments of this disclosure.
Figure 4:
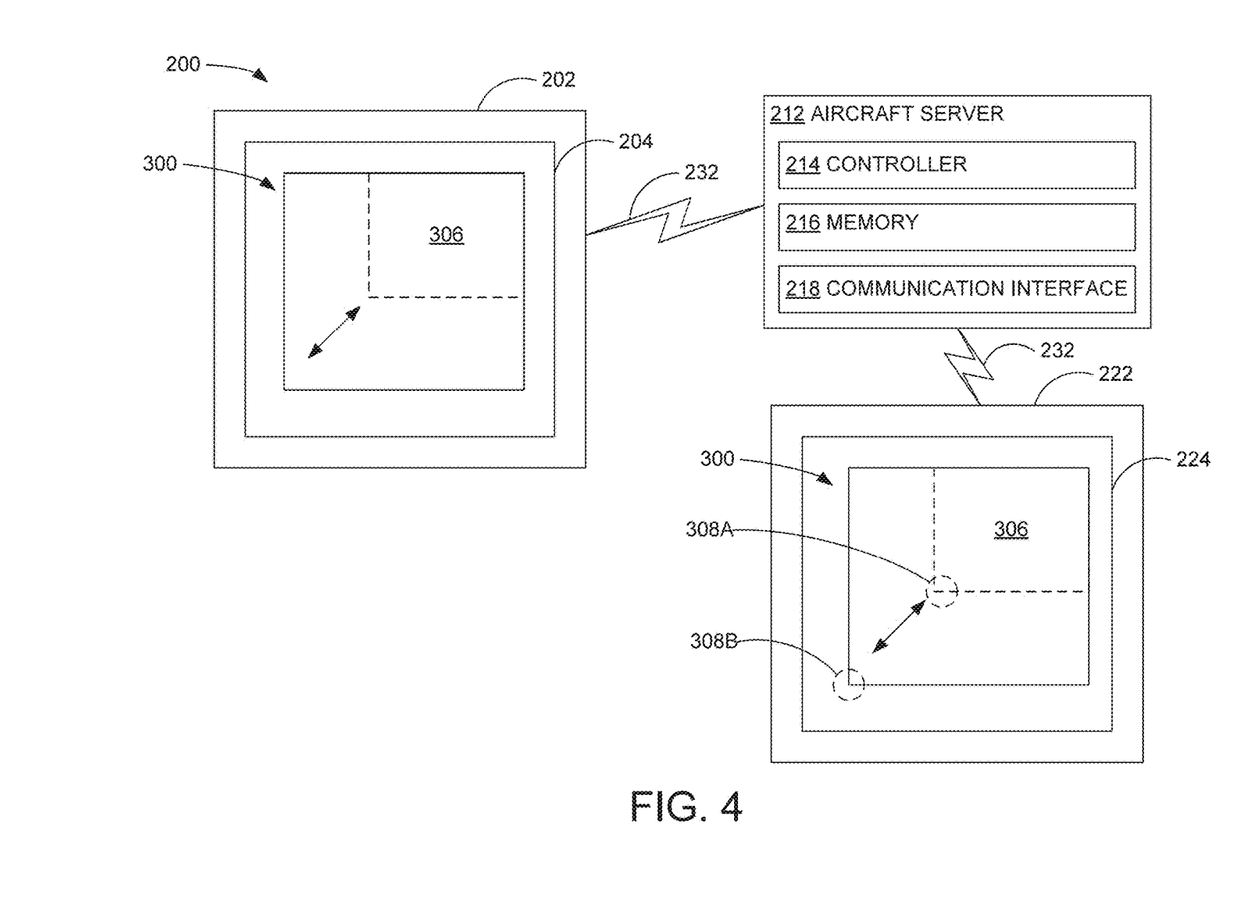
FIG. 4 is a block diagram illustrating a system for navigating an aircraft display with a mobile device, in accordance with example embodiments of this disclosure.

As shown in FIGS. 3 and 4, the controller 214 of the aircraft server 212 is configured to generate a graphical user interface 300 at the display 204 of the aircraft display system 202. For example, in an embodiment, the controller 214 of the aircraft server 212 is configured to transmit instructions and/or display signals to the aircraft display system 202 that cause the controller 206 to generate the graphical user interface 300 at the display 204. The controller 214 can be further configured to mirror the graphical user interface 300 at the display 224 of the mobile device 222. For example, the controller 214 may be configured to transmit instructions and/or display signals to the mobile device 222 that cause the controller 226 to generate the graphical user interface 300 at the display 224 of the mobile device 222. In some embodiments, the controller 214 is configured to communicate with (e.g., host) an application (e.g., a mobile application) running on the mobile device 222 that enables the mobile device 222 to mirror the graphical user interface 300 generated at the display 204 of the aircraft display system 202 based on the instructions and/or display signals transmitted by the aircraft server 212.

In other embodiments, the aircraft display system 202 and the mobile device 222 may be in communication with one another over the network 232, or via Bluetooth, NFC, internet connection, or the like, where the controller 206 of the aircraft display system 202 is configured to generate the graphical user interface 300 at the display 204 and is further configured to mirror the graphical user interface 300 at the display 224 of the mobile device. For example, the controller 206 may be configured to transmit instructions and/or display signals to the mobile device 222 that cause the controller 226 to generate the graphical user interface 300 at the display 224 of the mobile device 222. In some embodiments, the controller 206 is configured to communicate with an application (e.g., a mobile application) running on the mobile device 222 that enables the mobile device 222 to mirror the graphical user interface 300 generated at the display 204 of the aircraft display system 202.

As shown in FIG. 3, the graphical user interface 300 may include one or more interactive features. For example, the graphical user interface 300 may include one or more selectable features (e.g., selectable features 302A, 302B, etc.), such as buttons, tabs, windows, icons, text boxes, or the like. In some embodiments, the graphical user interface 300 may include a cursor 304 for navigating the selectable features. The graphical user interface 300 may include one or more windows 306 with an electronic map and/or flight data.

The system 200 is configured to receive user inputs via the mobile device 222. For example, the display 224 (e.g., touchscreen display) or another input device of the mobile device 222 can receive a user input (e.g., a selection, text prompt, cursor movement, multi-touch gesture, etc.) corresponding to an interaction with the graphical user interface 300. In embodiments, the controller 214 of the aircraft server 212 can receive the user input based on one or more signals transmitted by the mobile device 222 over the network 232, or via Bluetooth, NFC, internet connection, or the like. The controller 214 is then configured to update the graphical user interface 300 at the aircraft display 204 and the mobile device 222 (e.g., at display 224) based upon the user input. For example, the controller 214 can transmit display signals and/or instructions to the respective devices and/or applications running on the devices. In other embodiments, the controller 206 of the aircraft display system 202 can receive the user input based on one or more signals transmitted by the mobile device 222 over the network 232, or via Bluetooth, NFC, internet connection, or the like; and the controller 206 may be configured to update the graphical user interface 300 at the aircraft display 204 and the mobile device 222 (e.g., at display 224) based upon the user input.

The system 200 may be further configured to receive user inputs via one or more input devices 220 coupled to the aircraft display system 202 or the aircraft server 212. For example, the input device 220 may be used to perform a user input (e.g., a selection, text prompt, cursor movement, multi-touch gesture, etc.) corresponding to an interaction with the graphical user interface 300. In an embodiment, the controller 214 of the aircraft server 212 can receive the user input based on one or more signals transmitted by the aircraft display system 202 over a direct (e.g., ad-hoc connection), over the network 232, or via Bluetooth, NFC, internet connection, or the like. The controller 214 is then configured to update the graphical user interface 300 at the aircraft display 204 and the mobile device 222 (e.g., at display 224) based upon the user input. For example, the controller 214 can transmit display signals and/or instructions to the respective devices and/or applications running on the devices. In another embodiment, the controller 206 of the aircraft display system 202 may be configured to update the graphical user interface 300 at the aircraft display 204 and the mobile device 222 (e.g., at display 224) based upon the user input. In yet another embodiment, the aircraft server 212 is coupled to the input device 220. Thus, the controller 214 may be configured to update the graphical user interface 300 at the aircraft display 204 and the mobile device 222 (e.g., at display 224) based upon a user input received directly from the input device 220.

FIG. 4 shows an example embodiment of the system 200, where the mobile device 222 includes a multi-touch interface. For example, the display 224 (e.g., touchscreen display) may be configured to receive multi-touch gestures. In other embodiments, the mobile device 222 may include another type of multi-touch interface (e.g., a touchpad, trackpad, or the like). In some embodiments, the multi-touch interface of the mobile device 222 is also pressure sensitive so that the force applied to the multi-touch interface affects the nature of the user input (e.g., zoom level, single-click vs. double-click, or the like). As shown in FIG. 4, a window 306 including flight data and/or an electronic map may be resizable by contacting multiple points (e.g., points 308A and 308B) of the window 306 and bringing the contacted points closer together or pulling them further apart. When a multi-touch gesture to resize the window 306 is performed at the mobile device 224, the controller 214 at the aircraft server 212 (or the controller 206 at the aircraft display system 202) is configured to receive signals associated with the multi-touch gesture from the mobile device 222 and is further configured to update the graphical user interface 300 (e.g., by resizing and/or moving the window 306) at the display 224 of the mobile device 222 and the display 204 of the aircraft display system 202 based upon the multi-touch gesture. In general, windows, icons, tabs, and the like may be resized and/or repositioned (e.g., by holding and dragging) via the display 224 or any other input device of the mobile device 222, whereby the graphical user interface 300 at both devices is updated in response.

Any user input performed at the aircraft display system 202 or the mobile device 222 to interact with or alter the graphical user interface 300 may be mirrored at the other one of the two devices. That is, any user input performed at the aircraft display system 202 to interact with or alter the graphical user interface 300 may be mirrored at the mobile device 222, and any user input performed at the mobile device 222 to interact with or alter the graphical user interface 300 may be mirrored at the aircraft display system 202. In some embodiments, to avoid latencies, the user inputs themselves (e.g., selections, text prompts, cursor movements, multi-touch gestures, etc.) are not mirrored, but the graphical user interface 300 is updated at both devices (the aircraft display system 202 and the mobile device 222) to reflect display changes resulting from the user inputs.

Figure 5:
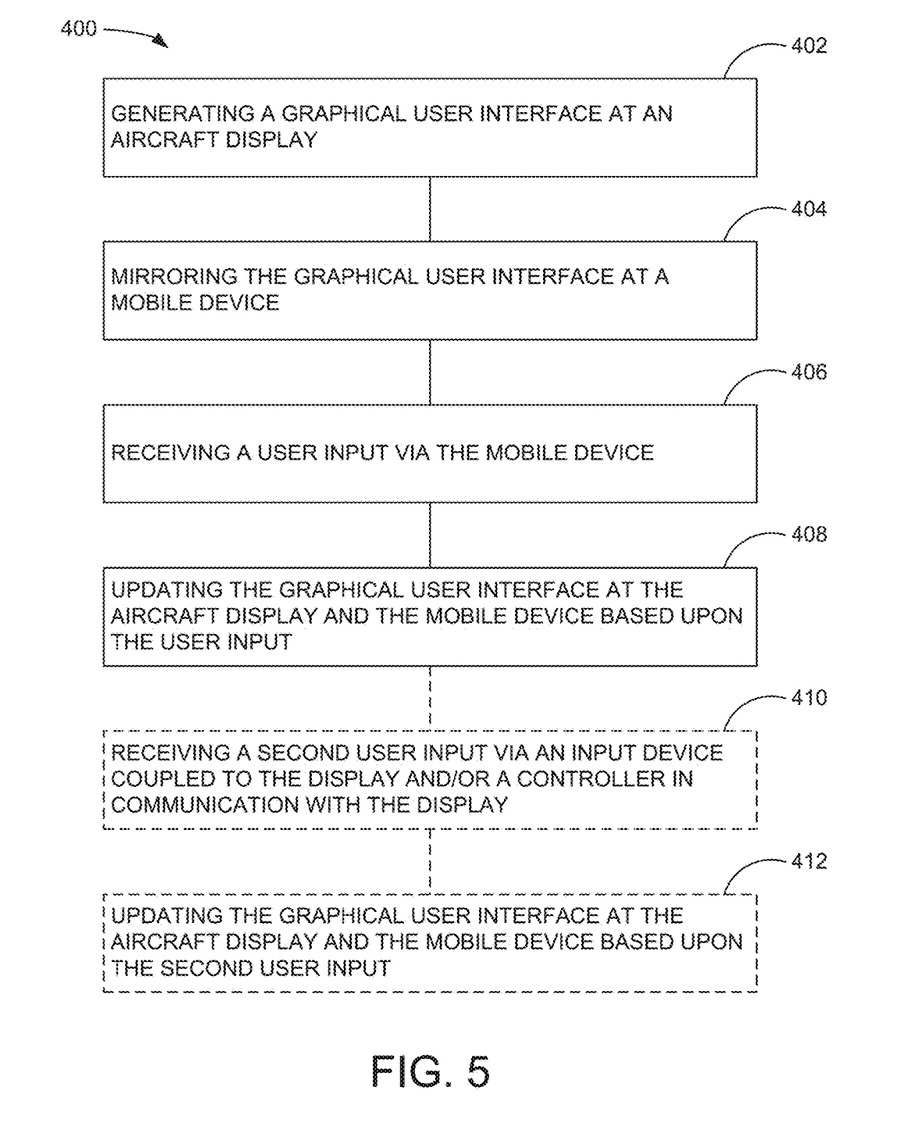
FIG. 5 is a flow diagram illustrating an example implementation of a method of navigating an aircraft display with a mobile device.

FIG. 5 illustrates an example implementation of a method 400 that employs a system, such as the system 200 illustrated in FIGS. 2 through 4, to navigate an aircraft display with a mobile device. In general, operations of disclosed processes (e.g., method 400) may be performed in an arbitrary order, unless otherwise provided in the claims.

The method 400 includes generating a graphical user interface 300 at an aircraft display 204 (block 402). The method 400 further includes mirroring the graphical user interface 300 at a mobile device 222 (e.g., at display 224) (block 404). A user input can be received via the mobile device (block 406). For example, a user input for interacting with the graphical user interface 300 may be entered via the display 224 (e.g., touchscreen display) or any other input device of the mobile device 222. The graphical user interface 300 at the aircraft display 204 and the display 224 of the mobile device 222 is updated based upon the user input (block 408).

In some implementations, the method 400 further includes receiving at least a second user input via an input device 220 coupled to the aircraft display 204 or a controller 206/214 in communication with the aircraft display 204 (block 410). For example, one or more user inputs can be entered via an input device 220 coupled to the aircraft display system 202 and/or the aircraft server 212. In such implementations, the method 400 further includes updating the graphical user interface 300 at the aircraft display 204 and the mobile device 222 based upon the second user input (block 412). The method 400 may further include any step or operation implied or required by the embodiments of system 200 described herein.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for navigating an aircraft display with a mobile device, comprising:
   an aircraft display; and
   an aircraft server in communication with the aircraft display and a mobile device, the aircraft server including a controller configured to:
      generate a graphical user interface at the aircraft display,
      receive a user input via the mobile device, and update the graphical user interface at the aircraft display based upon the user input received via the mobile device.

2. The system of claim 1, wherein the aircraft display comprises at least one of a primary flight display or a multi-function aircraft display.

3. The system of claim 1, further comprising:
a wireless network configured to communicatively couple the aircraft server to the mobile device.

4. The system of claim 1, wherein the controller is further configured to:
mirror the graphical user interface at the mobile device; and
update the graphical user interface at the mobile device concurrently with updating the graphical user interface at the aircraft display based upon the user input received via the mobile device.

5. The system of claim 4, further comprising:
an input device coupled to at least one of the aircraft display or the aircraft server, wherein the controller is further configured to:
receive a second user input via the input device, and
update the graphical user interface at the aircraft display and the mobile device based upon the second user input.

6. The system of claim 1, wherein the graphical user interface includes at least one selectable feature.

7. The system of claim 1, wherein the graphical user interface includes at least one movable cursor.

8. The system of claim 1, wherein the graphical user interface includes a window with at least one of flight data or an electronic map.

9. The system of claim 8, wherein the window is resizable via a multi-touch interface of the mobile device.

10. A system for navigating an aircraft display with a mobile device, comprising:
a mobile device including a touchscreen display;
an aircraft display; and
a controller in communication with the aircraft display and the mobile device, the controller configured to:
generate a graphical user interface at the aircraft display,
mirror the graphical user interface at the touchscreen display of the mobile device,
receive a user input via the touchscreen display of the mobile device, and
update the graphical user interface at the aircraft display and the touchscreen display of the mobile device based upon the user input.

11. The system of claim 10, further comprising:
an input device coupled to at least one of the aircraft display or the controller.

12. The system of claim 11, wherein the controller is further configured to:
receive a second user input via the input device, and
update the graphical user interface at the aircraft display and the touchscreen display of the mobile device based upon the second user input.

13. The system of claim 10, wherein the graphical user interface includes at least one selectable feature.

14. The system of claim 10, wherein the graphical user interface includes at least one movable cursor.

15. The system of claim 10, wherein the graphical user interface includes a window with at least one of flight data or an electronic map.

16. The system of claim 15, wherein the window is resizable via the touchscreen of the mobile device, wherein the touchscreen comprises a multi-touch interface.

17. A method of navigating an aircraft display with a mobile device, comprising:
generating a graphical user interface at an aircraft display;
mirroring the graphical user interface at a mobile device;
receiving a user input via the mobile device; and
updating the graphical user interface at the aircraft display and the mobile device based upon the user input.

18. The method of claim 17, further comprising:
receiving a second user input via an input device coupled to at least one of the aircraft display or a controller in communication with the aircraft display; and
updating the graphical user interface at the aircraft display and the mobile device based upon the second user input.

19. The method of claim 17, wherein the graphical user interface includes at least one of a selectable feature or a movable cursor.

20. The method of claim 17, wherein the graphical user interface includes a window with at least one of flight data or an electronic map, and the window is resizable via a multi-touch interface of the mobile device.

* * * * *